(12) United States Patent
Fortson et al.

(10) Patent No.: US 9,069,707 B1
(45) Date of Patent: Jun. 30, 2015

(54) INDEXING DEDUPLICATED DATA

(75) Inventors: Michael Fortson, Cambridge, MA (US); Jonathan Coburn, Cambridge, MA (US); Michael Sclafani, Cambridge, MA (US); Thomas Jaskiewicz, Mason, NH (US); Assar Westerlund, Somerville, MA (US); Hooman Vassef, Arlington, MA (US)

(73) Assignee: Permabit Technology Corp., Cambridge, MA (US)

( * ) Notice: Subject to any disclaimer, the term of this patent is extended or adjusted under 35 U.S.C. 154(b) by 520 days.

(21) Appl. No.: 13/288,440

(22) Filed: Nov. 3, 2011

(51) Int. Cl.
G06F 7/00 (2006.01)
G06F 17/00 (2006.01)
G06F 11/14 (2006.01)
G06F 17/30 (2006.01)

(52) U.S. Cl.
CPC ........ G06F 11/1446 (2013.01); G06F 11/1458 (2013.01); *G06F 17/30321* (2013.01)

(58) Field of Classification Search
CPC ............ G06F 11/1448; G06F 11/1458; G06F 17/30321; G06F 17/30613
See application file for complete search history.

(56) References Cited

U.S. PATENT DOCUMENTS

| 7,457,800 | B2 | 11/2008 | Margolus et al. | |
|---|---|---|---|---|
| 7,457,813 | B2 | 11/2008 | Margolus et al. | |
| 7,567,188 | B1 * | 7/2009 | Anglin et al. | 341/63 |
| 8,463,742 | B1 | 6/2013 | Floyd et al. | |
| 2007/0226211 | A1 * | 9/2007 | Heinze et al. | 707/6 |
| 2009/0112945 | A1 * | 4/2009 | Camble et al. | 707/204 |
| 2009/0234795 | A1 * | 9/2009 | Haas et al. | 707/1 |
| 2011/0225191 | A1 | 9/2011 | Xie | |
| 2011/0231362 | A1 * | 9/2011 | Attarde et al. | 707/609 |
| 2012/0159098 | A1 | 6/2012 | Cheung et al. | |
| 2012/0166401 | A1 | 6/2012 | Li et al. | |
| 2012/0166448 | A1 | 6/2012 | Li et al. | |
| 2012/0226699 | A1 | 9/2012 | Lillibridge | |
| 2013/0036289 | A1 | 2/2013 | Welnicki et al. | |

OTHER PUBLICATIONS

Alvarez, Carlos, "NetApp Deduplication for FAS and V-Series Deployment and Implementation Guide (Technical Report)," Jan. 2010, TR-3505, Rev. 7, 46 pages.
Lillibridge, Mark et al. "Sparse Indexing: Large Scale, Inline Deduplication Using Sampling and Locality," Proceedings of the 7th conference on File and storage technologies, Feb. 24-27, 2009, San Francisco, California, pp. 111-123.
Unpublished U.S. Appl. No. 13/117,629, filed May 27, 2011, 42 pages.

* cited by examiner

*Primary Examiner* — Azam Cheema
(74) *Attorney, Agent, or Firm* — Fish & Richardson P.C.

(57) ABSTRACT

In general, in one aspect, a method for managing data in a data storage system includes receiving identifiers corresponding to different respective entries of a map stored in the data storage system, with a particular identifier corresponding to a particular entry of the map, the particular entry including a computed value corresponding to a particular portion of data stored in the data storage system and metadata indicating a location where the particular portion of data is stored in the data storage system, selecting, according to a first selection criterion, at least some of the identifiers for storage in a first portion of an index, and selecting, according to a second selection criterion, at least some of the identifiers for storage in a second portion of the index.

57 Claims, 4 Drawing Sheets

INDEXING DEDUPLICATED DATA

BACKGROUND

This description relates to managing and indexing deduplicated data.

Some data storage systems are configured to include a deduplication function that is used to reduce the amount of storage capacity that is needed to store received data (e.g., data to be stored in the data storage system). In some implementations, deduplication works by segmenting received data into segments (also called "chunks" of data) that are identified in an index by a value, such as a cryptographic hash value. A form of data compression can be achieved by preventing duplicate segments from being stored when the data is being stored in the data storage system. For example, a given file (made up of one or more segments) that has already been stored (e.g., an email attachment attached to multiple emails in an email storage system) can simply be replaced with a reference to the previously stored file if the previously stored file has the same segments. Alternatively, a given segment within a given file that is the same as another segment in the given file or another file (e.g., a portion of document within a ZIP archive that is also stored in another ZIP archive) can be replaced with a reference to the duplicate segment.

SUMMARY

In general, managing data in a data storage system, the method comprising receiving identifiers corresponding to different respective entries of a map, with a particular identifier corresponding to a particular entry of the map, the particular entry including a computed value corresponding to a particular portion of data stored in the data storage system and metadata indicating a location where the particular portion of data is stored in the data storage system; selecting, according to a first selection criterion, at least some of the identifiers for storage in a first portion of an index; and selecting, according to a second selection criterion, at least some of the identifiers for storage in a second portion of the index.

Implementations may include one or more of the following features.

The method includes generating at least some of the identifiers. The method includes storing identifiers in the first portion of the index until the first portion of the index reaches a predetermined size. The method includes determining that a first identifier corresponding to a first entry of the map, received after the first portion of the index reached the predetermined size, was not already stored in the first portion of the index before the first identifier was received, removing at least a second identifier corresponding to a second entry of the map from the first portion of the index, and storing the first identifier in the first portion of the index, such that the first portion of the index does not exceed the predetermined size. The method includes designating the second identifier for storage in the second portion of the index. The method includes accessing at least one of the identifiers stored in the first index and copying the entry of the map corresponding to the accessed identifier to a cache for recently accessed identifiers. Identifying at least one other entry of the map that was stored in the map at approximately the same time as the entry of the map corresponding to the first identifier, and copying the other entry of the map to the cache. The method includes accessing at least one of the identifiers stored in the index, and accessing an entry of the map corresponding to the accessed identifier from a cache for recently accessed identifiers. Accessing at least one other entry of the map in the cache, wherein the other entry of the map has no corresponding identifier stored in the index. Selecting at least some of the identifiers according to a first selection criterion comprises selecting at least some of the identifiers at a first sample rate. Selecting at least some of the identifiers according to a second selection criterion comprises selecting at least some of the identifiers at a second sample rate different from the first sampling rate. Identifiers selected at a first sample rate have been accessed more recently than the identifiers selected at a second sample rate, and the first sample rate is greater than the second sample rate. Selecting at least some of the identifiers according to a first selection criterion comprises selecting at least some of the identifiers from a first set of identifiers. Selecting at least some of the identifiers according to a second selection criterion comprises selecting at least some of the identifiers from the first set of identifiers. Selecting at least some of the identifiers according to a second selection criterion comprises selecting at least some of the identifiers from a second set of identifiers, wherein the second set includes no identifiers in the first set. Selecting at least some of the identifiers according to a second selection criterion comprises selecting at least some of the identifiers from a second set of identifiers, wherein the second set includes some identifiers in the first set. Selecting at least some of the identifiers according to a first selection criterion comprises stochastically selecting at least some of the identifiers based on at least a portion of a value associated with the respective identifier. The value associated with the respective identifier comprises the computed value corresponding to the particular portion of data corresponding to the respective identifier. Selecting at least some of the identifiers according to a first selection criterion comprises selecting a threshold number of most recently used identifiers, wherein the threshold number is a predetermined size of the first portion of the index.

In another aspect, a computer-readable storage medium stores a computer program for managing data in a data storage system. The computer program includes instructions for causing a computing system to: receive identifiers corresponding to different respective entries of a map, with a particular identifier corresponding to a particular entry of the map, the particular entry including a computed value corresponding to a particular portion of data stored in the data storage system and metadata indicating a location where the particular portion of data is stored in the data storage system; select, according to a first selection criterion, at least some of the identifiers for storage in a first portion of an index; and select, according to a second selection criterion, at least some of the identifiers for storage in a second portion of the index.

In another aspect, a system for managing data includes: a data storage system storing the data being managed; and a computing system configured to manage the data based on a map. The managing includes: receiving identifiers corresponding to different respective entries of the map, with a particular identifier corresponding to a particular entry of the map, the particular entry including a computed value corresponding to a particular portion of data stored in the data storage system and metadata indicating a location where the particular portion of data is stored in the data storage system; selecting, according to a first selection criterion, at least some of the identifiers for storage in a first portion of an index; and selecting, according to a second selection criterion, at least some of the identifiers for storage in a second portion of the index.

In another aspect, a method for managing data in a data storage system comprises receiving identifiers corresponding to different respective entries of a map, with a particular identifier corresponding to a particular entry of the map, the particular entry including a computed value corresponding to a particular portion of data stored in the data storage system and metadata indicating a location where the particular portion of data is stored in the data storage system; non-uniformly selecting at least some of the identifiers for storage in an index.

Implementations may also include one or more of the following features.

Non-uniformly selecting at least some of the identifiers for storage in an index comprises stochastically selecting at least some of the identifiers based on at least a portion of a value associated with the respective identifier. The value associated with the respective identifier comprises the computed value corresponding to the particular portion of data corresponding to the identifier. Non-uniformly selecting at least some of the identifiers for storage in an index comprises selecting at least some of the identifiers based on a first sample rate and selecting at least some of the identifiers according to a second sample rate.

Another aspect can include a method for managing data in a data storage system including receiving identifiers corresponding to different respective entries of a map, with a particular identifier corresponding to a particular entry of the map, the particular entry including a computed value corresponding to a particular portion of data stored in the data storage system and metadata indicating a location where the particular portion of data is stored in the data storage system, selecting a first set of the identifiers for storage in a first portion of an index, wherein the first set comprises most recently accessed identifiers, and selecting a second set of the identifiers for storage in a second portion of the index, wherein the second set comprises identifiers selected at a sample rate.

Another aspect can include a method for managing data in a data storage system including non-uniformly selecting a plurality of entries of a map, a particular entry including a computed value corresponding to a particular portion of data stored in the data storage system and metadata indicating a location where the particular portion of data is stored in the data storage system, generating identifiers each corresponding to a particular non-uniformly selected entry of the map, and storing the identifiers in an index.

Aspects can include one or more of the following features. Identifiers can be stored in an index using multiple selection criteria.

Other aspects and advantages will be apparent from the detailed description, drawings, appendices and claims.

DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
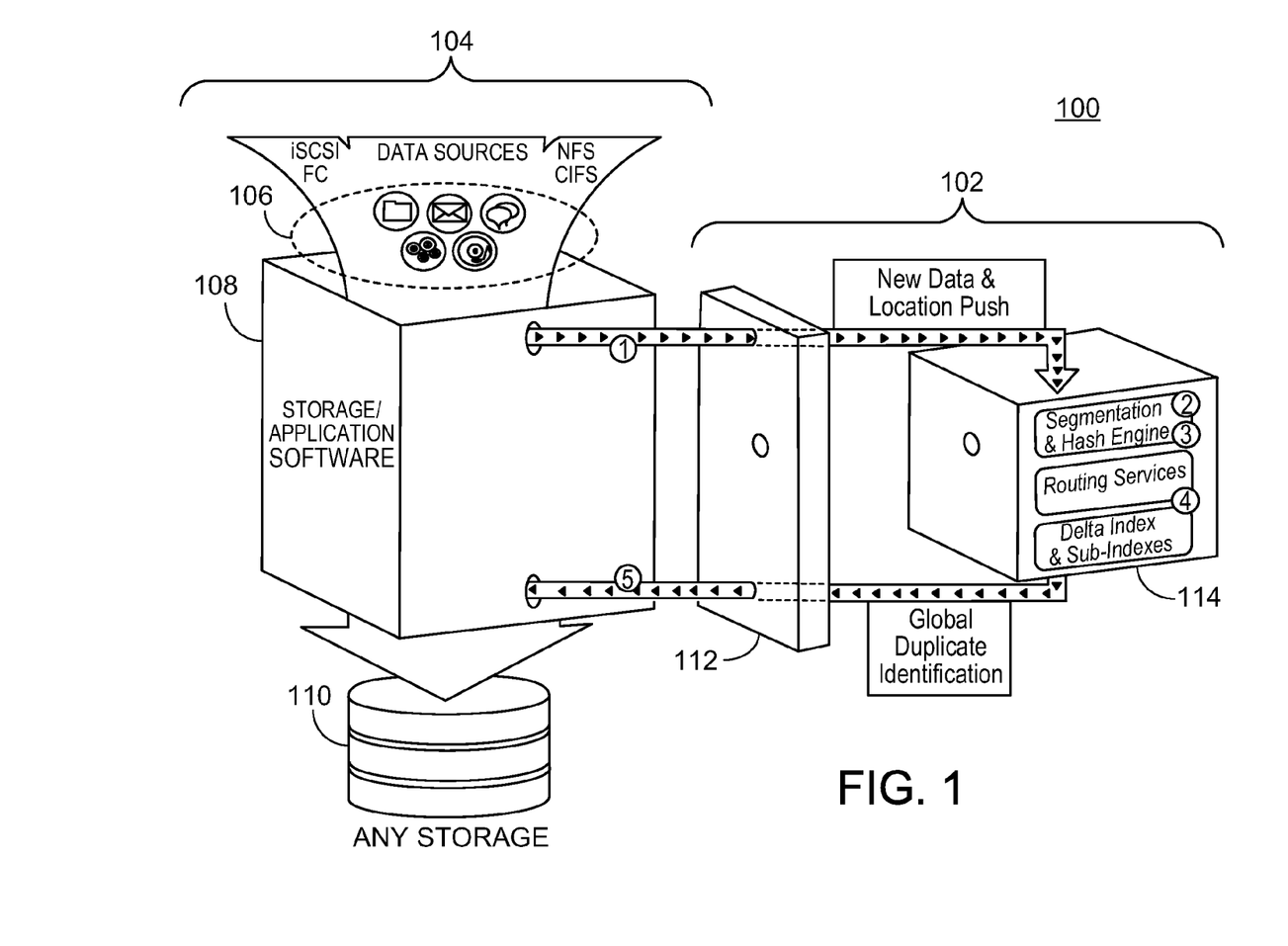
FIG. 1 is a block diagram of a system for managing stored data.

FIG. 1 shows an exemplary system 100 for integrating a deduplication engine 102 into a data storage system 104. The data storage system 104 is configured to receive any of a variety of types of data 106 from one or more data sources. The data 106 can include, for example, different types of files from various file systems, having different data types, and/or corresponding to different applications or operating system layers (e.g., electronic mail, media files or streams, software libraries, etc.). In this example, the system 104 includes a software layer 108 running in an execution environment hosted on one or more general-purpose computers under the control of a suitable operating system. The software layer can be configured as a database, for example, or another type of application that manages stored data. The system 104 also includes one or more storage media 110 within the execution environment accessible to the software layer 108. The execution environment can include a configuration of computer systems or computer system components (e.g., coupled via a local area network (LAN) or a storage-area network (SAN)). In some examples, a storage system other than a file system is used. For example, a storage system such as a block system or object storage system could be used in place of or in addition to a file system.

The deduplication engine 102 can be configured to provide a deduplication function for use by the data storage system 104. In some examples, the deduplication engine 102 may provide an application programming interface (API) 112 that includes various functions that can be called from within the software layer 108 of the data storage system 104. The software layer 108 can store new data in the media 110, in some examples taking into account advice returned as output of the functions of the API 112 about whether portions of the data have already been stored in the media 110, and if so where the portions are stored. In response to the deduplication advice indicating which new segments of data have duplicates that are already stored, the software layer 108 can determine whether to represent some of the new segments by referring to the previously stored duplicates instead of storing the new segments. In some examples, the deduplication engine 102 is integrated in a storage system in such a way that an API is optional or not used.

When deduplication advice is desired for new data, the software layer 108 provides the new data to the deduplication engine 102 by calling a function of the API 112. The function can be called at any of a variety of stages including: while the new data is being written to the media 110, or at any subsequent time as determined by the software layer 108. Along with the new data, the software layer 108 can provide other input to the function such as application-specific metadata. For example, location information can be provided that describes where the new data is located (e.g., in a temporary storage location within the media 110 or other storage media) in the system 100 or an external location. The software layer 108 is also able to improve the accuracy of the advice from the deduplication engine 102 by calling functions of the API 112 to update the index when data is deleted or modified. In some implementations, the software layer 108 may also provide a sequence number along with the application specific metadata to the function. The software layer 108 can use the sequence number to quickly verify whether or not the deduplication advice is valid. If the location information has changed since the last time the software layer 108 queried the deduplication engine 102, then the sequence number will indicate that the deduplication advice is outdated.

In some implementations, the deduplication advice can be used by a remote user or client of a data storage system 104 to determine if a data segment needs to be transmitted over a network. For example, if the data segment is a duplicate of an existing copy of the segment, then the existing copy of the segment can be referenced instead thus saving network capacity and possibly also storage capacity.

The deduplication engine 102 includes a segmentation and index management module 114 that performs various actions to handle calls to the functions of the API 112. The module 114 segments the new data into fixed- or variable-length segments, optionally taking into account characteristics of the new data to determine appropriate boundaries for the segments. For example, duplicate data may occur in files having different block alignments, such as when a file appears within two ZIP archives at different locations relative to the start of the archive. Content-aware segmentation enables the embedded file to be located and deduplicated even if the file appears at different offsets in the two archives.

The module 114 computes fingerprints as identifiers corresponding to different respective segments. In some implementations, the module 114 computes hash values that uniquely identify different respective segments, and includes the entire hash value or a shorter portion of the hash value or a shorter computed value based on the hash value in the fingerprint. In some implementations, the module 114 uses SHA-256 cryptographic hashing algorithm designed by the National Security Agency to compute the hash values for the respective segments. For example, techniques for using abbreviated values for the fingerprint are described in U.S. Pat. No. 7,457,800, and U.S. Pat. No. 7,457,813, each of which is incorporated herein by reference.

In some implementations, the fingerprint also includes a domain tag representing a domain in which one or more segments are being stored and managed. For example, the domain tag can corresponds to a section of a file system in which the one or more segments are being stored, a portion of a storage medium including, for example, any of the following: a disk or disk volume (e.g., identified by a logical unit number (LUN)), a data protected set of disks, a storage device, or a cluster of storage devices). The inclusion of the domain tag in the fingerprint enables the system 100 to distinguish between different segments that may have identical content (and therefore identical hash values) but are stored in different media and/or file systems, where it may be difficult to create references to between data stored in those different media and/or file systems.

The deduplication engine 102 stores the fingerprints in an index that includes multiple entries, each entry storing one of the fingerprints. Each entry stores a reference to the segment corresponding to the fingerprint stored in the entry.

In some implementations, different data segments may need to be indexed in the same index without being deduplicated across the segments. By way of example, a service provider may have two customer volumes on the same underlying media, but data cannot be shared between volumes. To address this situation, the index may support the creation of a domain identifier or tag (e.g., a namespace) to be associated with each segment (e.g., Client1 and Client2). The data segment associated with the first domain, e.g., Client1, will not deduplicate with the data segment associated with the second domain, e.g. Client2.

When a duplicate segment is identified, a duplicate data advisory can be sent to the software layer 108. In some implementations, the advisory can be synchronously sent via a function return. In some implementations, the advisory can be asynchronously sent via a previously registered callback function. The advisory provides metadata necessary for the software layer 108 to determine the duplicate information. For example, the metadata can include a location of the duplicate data and possibly a sequence number, each corresponding to the new segment and the previously stored segment. In some examples, the software layer 108 may notify the deduplication engine 102 that the advice is outdated (e.g., based on sequence numbers described above). In such instances, the deduplication engine 102 updates its index to remove the outdated information. In some examples, the software layer 108 can unify data extents within the file system specific to the software layer 108 based on the advice.

When a duplicate segment is identified, a reference to the segment can also be stored in a data structure that is separate from the index. In some implementations, the data storage system 104 stores a reference to the location of a duplicate segment using a data structure that is independent of the deduplication engine 102, such as a data structure in the file system inode structure of the media 110, where the data structure is able to point directly to the location where the duplicate data is stored on the media 110 (e.g., a location on a disk). This can provide the advantage of the data storage system 104 being able to operate independently of the deduplication engine 102, without the need to rely on the index to access files that include segments that are references to duplicate segments from other files or locations within the same file. In such implementations, the deduplication engine 102 does not become critical to the reliability and availability of the data storage system 104 for data retrieval.

In alternative implementations, the data storage system 104 only stores the fingerprint value for the duplicate segment. In such implementations, the data storage system 104 would have to query the deduplication engine 102 as to where the referenced segment was located, and the deduplication engine 102 would become critical to the operation of the data storage system 104.

The index can be managed such that the size of the index does not exceed a predetermined maximum size. This enables the deduplication engine 102 to limit the amount of storage space required for the index. The deduplication engine 102 provides deduplication advice for data that falls within a deduplication window corresponding to the most recently "seen" segments in order of how recently they have been seen (e.g., accessed or used). In some implementations, the index can include an on-disk volume for recording names corresponding to the data segments. Using this on-disk volume, the deduplication engine 102 is able to determine the deduplication window for which the engine 102 provides deduplication advice. In some implementations, a sampling technique is used to choose the entries that appear in the index. Sampling is discussed in greater detail below. In some implementations, the index contains identifiers corresponding to entries of a map, and entries of the map correspond to segments of a storage medium.

Figure 2:
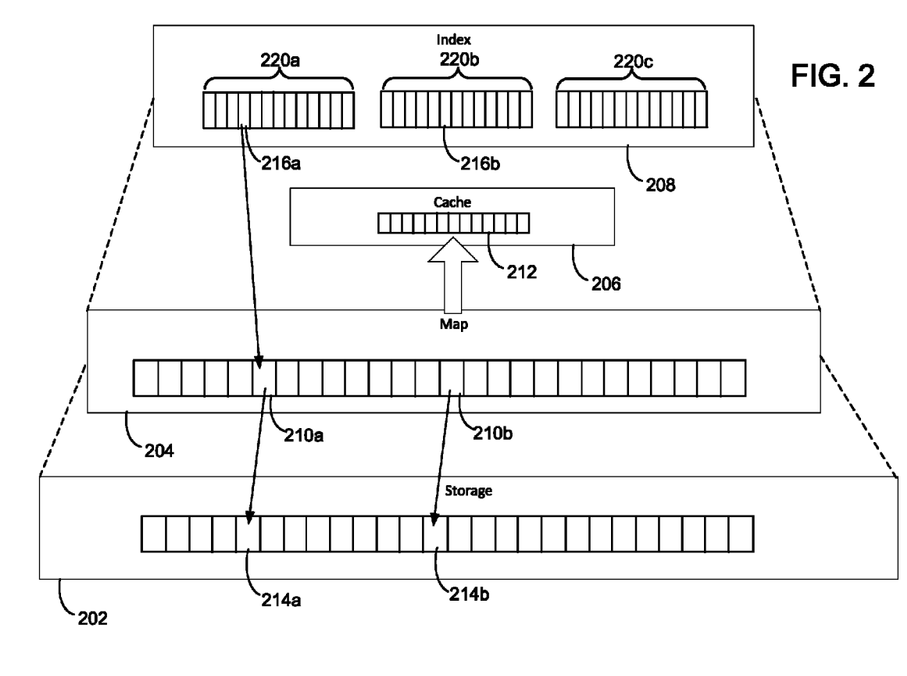
FIG. 2 shows an example of an indexing technique.

FIG. 2 shows an example of an indexing technique. A map 204 stores entries 210a, 210b pointing to segments 214a, 214b of a storage medium 202. For example, the storage medium 202 could be the media 110 shown in FIG. 1. Each of the entries 210a, 210b of the map 204 points to a particular segment 214a, 214b of the storage medium 202. For example, each of the entries 210a, 210b may contain a computed value corresponding to data stored in the corresponding segment 214a, 214b and also may contain metadata indicating a location of the corresponding segment 214a, 214b in the storage medium 202. For example, the computed value can be a fingerprint value computed by a hash function, and the metadata can be an address of the segment 214a, 214b.

An index 208 stores identifiers 216a, 216b corresponding to entries 210a of the map. An identifier 216a can be used to determine if the corresponding entry 210a is stored in the map 204. Put another way, each identifier 216a represents a corresponding entry 210a. For example, the identifiers 216a, 216b can contain a computed value corresponding to data stored in a segment 214a of the storage medium 202. In some examples, the computed value contained in an identifier 216a may be the same as the computed value contained in the corresponding entry 210a of the map 204. In some examples, the computed value contained in an identifier 216a may be different from the computed value contained in the corresponding entry 210a of the map 204. For example, the computed value contained in an identifier 216a may have been generated by a hash function that generates values of a first size, and the computed value contained in the corresponding entry 210a of the map 204 may have been generated by a hash function that generates values of a second size. The identifiers 216a, 216b can also contain metadata identifying the corresponding entry 210a of the map 204. For example, the identifier 216a can also contain the location of a portion of the map 204 that contains the corresponding entry 210a of the map 204 along with other map entries 210b that were recorded or stored at approximately the same time.

In some implementations, the identifiers 216a can be generated when the index 208 is generated. In some implementations, the identifiers 216a are chosen from an existing set of identifiers. For example, the index 208 changes as the deduplication system is used, and some identifiers are discarded over time, while others are chosen to remain in the index 208. When the deduplication system is said to have selected or chosen identifiers for storage in the index 208, the identifiers can be existing identifiers that remain in the index or are moved to a different section or portion of the index, or the identifiers can be newly-generated identifiers, or any combination of these things.

In some examples, all of the entries 210a, 210b of the map 204 have a corresponding identifier 216a, 216b in the index 208. In some examples, some of the entries 210a of the map 204 have corresponding identifiers 216a, while other entries 210b have no corresponding identifier in the index 208. For example, the identifiers 216a, 216b chosen for storage in the index 208 can be chosen based on a sampling criterion. When a sampling criterion is used, a subset (sample) of the entries 210a of the map 204 are chosen to have corresponding identifiers 216a, and the remaining entries 210b of the map 204 have no corresponding identifier. A set of identifiers is said to be sampled if the identifiers only represent a subset (sample) of a particular group of entries of the map 204. By storing in the index 208 a subset of fewer than all entries of the map 204 in the index 208, the index 208 can be stored in a relatively smaller and/or faster storage medium (e.g., with some or all of the index 208 being stored in volatile memory), while the map 204 can be stored in a relatively larger and/or slower storage medium (e.g., with some or all of the map 204 being stored in non-volatile memory).

In some examples, identifiers 216a are chosen for corresponding entries 210a of the map 204 according to a sample rate. For example, a percentage (e.g., 1% or 10% or 50%) of the entries 210a can be chosen to have a corresponding identifier 216a. Put another way, identifiers 216a are chosen to represent a sample of the entries 210a. In some implementations, the identifiers 216a are chosen uniformly. For example, if identifiers 216a are chosen to represent 10% of the entries 210a of the map, then every tenth entry 210a can be chosen to be represented by an identifier 216a. In some examples, identifiers 216a are chosen non-uniformly. For example, a stochastic process can be used to determine which entries 210a will be represented by identifiers 216a. When a stochastic process is used, the identifiers 216a represent a random or non-deterministically selected sample of the entries 210a. In some implementations, the deduplication system can choose identifiers 216a based on a value associated with the identifier. For example, the deduplication system can examine data contained in the identifier 216a or data contained in an entry 210a associated with the identifier 216a. If 50% of the identifiers 216a, 216b are to be sampled, then the deduplication system can choose identifiers 216a having a "1" as the first bit of a data value contained in the identifier 216a, and discard identifiers 216b having a "0" as the first bit of a data value contained in the identifier 216b. In this way, because the distribution of "1" bits and "0" bits will be non-uniform among the identifiers 216a, 216b, the selected identifiers 216a, 216b will have been selected non-uniformly by the deduplication system.

In some implementations, the deduplication system has a cache 206 that contains a collection 212 of entries. The cache 206 can be accessed more quickly than the map 204. For example, the cache 206 may reside in memory that operates faster than memory in which the map 204 resides. When the deduplication system accesses an entry, the deduplication system can first determine if the entry can be accessed in the cache 206, and if so, avoid accessing the map 204. In some implementations, when an entry 210a is accessed in the map 204, the entry 210a can be copied to the cache 206 (e.g., replacing a different entry stored in the cache 206 less recently). The entry 210a can then be accessed again in the cache 206 (rather than the map 204) before it is removed from the cache (e.g., replaced by another entry).

In some implementations, the deduplication system sometimes stores multiple entries 210a, 210b that reference segments 214a, 214b of the storage medium 202 that are related. For example, the segments 214a, 214b may contain data representing portions of the same data file. In this example, if the segments 214a, 214b are stored at approximately the same time (e.g., relatively close times to each other within a second or within a few seconds or minutes), the deduplication system may also store entries 210a, 210b referencing the segments 214a, 214b at relatively close times to each other (e.g., when the deduplication system becomes aware of the segments 214a, 214b). Further, the deduplication system may store the entries 210a, 210b in close proximity to each other. For example, the entries 210a, 210b may be stored adjacent to each other in the map 204 (e.g., at sequential addresses within the map 204). When one entry 210a is accessed, an entry 210b related to the first entry 210a is likely to be accessed shortly thereafter, for example, if the entries 210a, 210b reference segments 214a, 214b containing data of a single data file.

Because related entries 210a, 210b may be stored in close proximity to each other in the map 204, when one entry 210a is stored in the cache 206, other entries 210b stored in close proximity to the first entry 210a can be stored in the cache 206 during the same cache loading operation. For example, for every entry 210a that the deduplication system stores in the cache, the deduplication system can store the most proximate other entries (e.g., five other entries or twenty other entries or another number of entries) in the same operation. In this way, if the first entry 210a is accessed, other entries 210b that are likely to be related, and thus also likely to be accessed shortly thereafter, will already be present in the cache 206.

In some implementations, the index 208 contains multiple index portions 220a, 220b, 220c. Each index portion can contain identifiers 216a, 216b chosen according to different criteria. In some examples, each index portion 220a, 220b, 220c corresponds to a particular category of entries 210a, 210b of the map 204. For example, one index portion 220a can contain identifiers corresponding to the most recently accessed entries 210a, 210b of the map 204. In some examples, each index portion 220a, 220b, 220c contains identifiers chosen according to different selection criteria. For example, one index portion 220a can contain identifiers selected according to a first sample rate (e.g., 10% of the corresponding entries of the map 204), and another index portion 220b can contain identifiers selected according to a second sample rate (e.g., 1% of the corresponding entries of the map 204). In some examples, one index portion 220a can contain identifiers sampled uniformly, and another index portion 220b can contain identifiers sampled non-uniformly (e.g., by a stochastic process).

Figure 3:
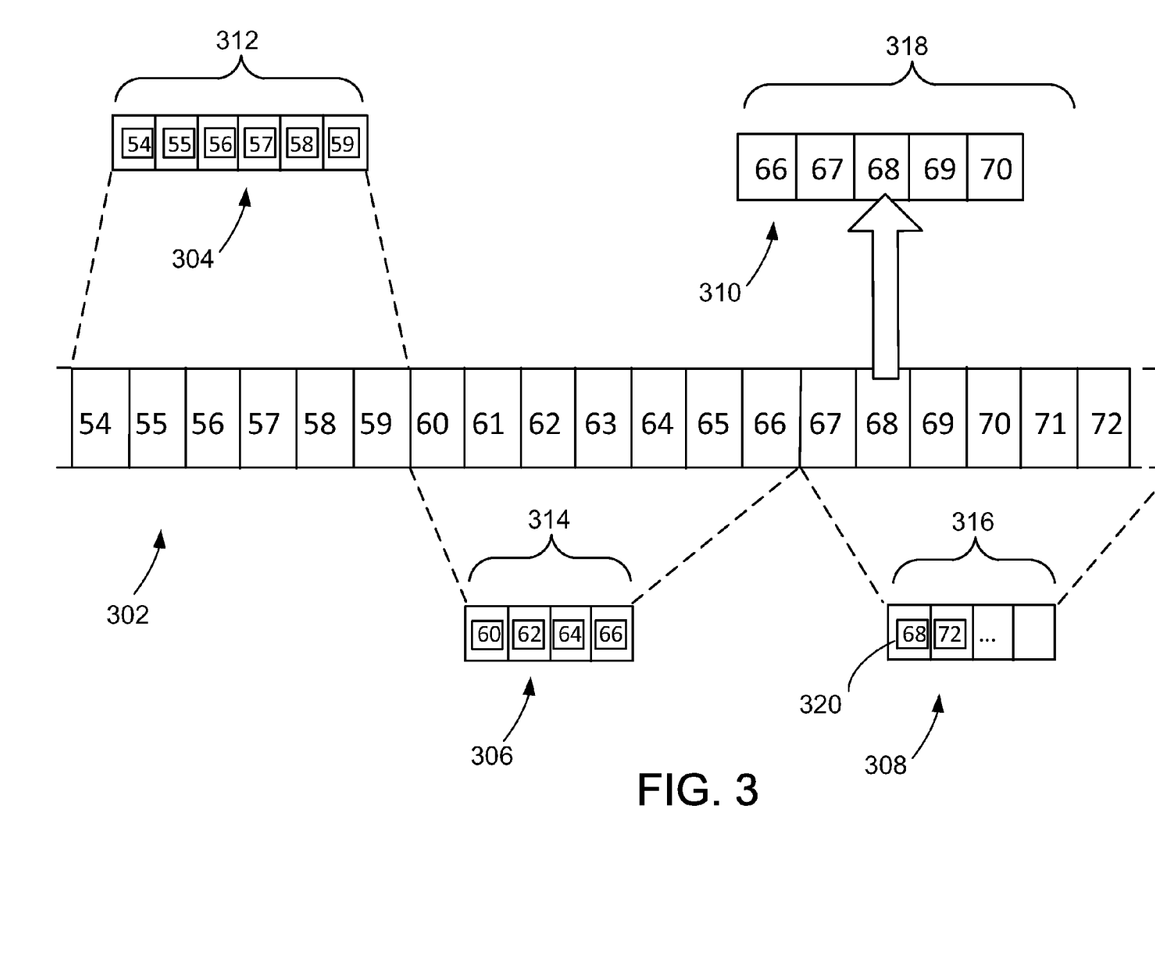
FIG. 3 shows an example of identifiers stored in an index and referencing entries of a map.

FIG. 3 shows an example of identifiers stored in an index and referencing entries of a map. The map 302 contains entries numbered sequentially. For example, the figure shows entries numbered 54 through 72. In this example, the entry numbered 54 has been most recently accessed (or "seen"), and the entry numbered 72 has been least recently accessed. The entries are shown sequentially in the figure for the purpose of this example; however, they may be stored in the map 302 in a different order than shown. For example, the map 302 may store the entries in a different order than an order determined by when an entry was recently accessed.

Identifiers corresponding to the entries can be stored in an index. In the example shown in the figure, the index is represented by three index portions 304, 306, 308. Each index portion 304, 306, 308 can store identifiers selected according to different criteria. In some examples, each of the index portions 304, 306, 308 can store identifiers corresponding to entries of the map stored or accessed at different times or stored in different portions of the map. In some examples, each of the index portions 304, 306, 308 can store identifiers selected according to different sample rates.

In the example shown, the first index portion 304 stores identifiers 312 corresponding to the most recently accessed entries of the map 302. In this example, the identifiers 312 represent entries numbered 54 to 59. Further, identifiers corresponding to all of the entries within that range are included in the index portion 304. Put another way, this index portion 304 has a sampling rate of 100%. In some examples, the index portion 304 storing the most recently used identifiers can have a predetermined size that corresponds to a threshold number of recently used identifiers.

The other index portions 306, 308 store less recently accessed entries of the map 302. In this example, one of the index portions 306 stores identifiers 314 representing the entries numbered 60 to 66. Another of the index portions 308 stores identifiers 314 representing the entries numbered greater than or equal to 67. Each of these two index portions 306, 308 can have their own respective sampling rates. For example, one index portion 306 may have a sampling rate of 50%, so that the identifiers 314 represent only half of the entries of the map 302 for which this index portion 306 stores identifiers. Another index portion 308 may have a sampling rate of 10%, so that the identifiers 316 represent only a tenth of the entries of the map 302 for which this index portion 308 stores identifiers. Further, the index portions 306, 308 may contain identifiers 314, 316 chosen uniformly or non-uniformly. For example, the identifiers 314 in one index portion 306 may be chosen uniformly such that every other entry has a corresponding identifier 314 in the index portion 306. For example, the identifiers 316 in another index portion 308 may be chosen non-uniformly such that identifiers 314 in the index portion 306 are chosen according to a stochastic process.

In this example, there is no overlap between identifiers stored in one of the index portions 304, 306, 308 and identifiers stored in another of the index portions 304, 306, 308. In some implementations, an identifier corresponding to a particular entry of the map 302 can be stored in more than one index portion 304, 306, 308.

Because multiple index portions 304, 306, 308 are used, the deduplication system can store identifiers in a way that maximizes the use of available storage space. For example, the most recently accessed (or most recently stored) identifiers (e.g., corresponding to the most recently accessed entries of the map 302) are more likely to be accessed again than identifiers accessed less recently. One of the index portions 304 can be dedicated to storing the most recently accessed identifiers. For example, the index portion 304 can store identifiers corresponding to all of the most recently accessed entries of the map 302, so that all of the most recently accessed entries of the map 302 can be accessed by way of an identifier. Further, the other index portions 306, 308 can store less recently accessed identifiers according to a sampling technique. For example, one index portion 306 can store identifiers 314 sampled at a rate of 50%. If this index portion 306 is the same size (e.g., stores the same number of identifiers) as the index portion 304 for most recently accessed identifiers, then this index portion 306 can store identifiers representing a portion of the map 302 twice as large as the index portion 304 for most recently accessed identifiers. Although some entries of the map 302 do not have a corresponding identifier in the index portion 306, the entries of the map 302 that do not have a corresponding identifier are less likely to be accessed than the entries of the map 302 having an identifier stored in the index portion 304 for most recently accessed identifiers.

The index portion 308 storing identifiers 316 accessed even less recently than the identifiers stored in the other index portions 304, 306 can be sampled at a lower rate than the other index portions 304, 306. Because these identifiers 316 have been least recently accessed, it is less likely that any particular identifier in this index portion 308 will be accessed. Thus, there will be relatively few times that the deduplication system will attempt to access an identifier for an entry of the map 302 having no identifier stored in the index.

As the deduplication system stores and accesses identifiers, the identifiers that have been accessed most recently can change. The deduplication system can add and remove identifiers from the index portions 304, 306, 308 over time. For example, if one identifier stored in the index portion 304 for recently accessed identifiers has not been accessed recently, the deduplication system can remove the identifier from that index portion 304. For example, this can be done to free up space in the index portion 304 for another identifier that has been accessed more recently, so that the index portion 304 does not exceed a predetermined number of identifiers or another predetermined size. The deduplication system can then move the identifier to another index portion 306 containing less recently used identifiers. The identifier may also be discarded depending on the sampling rate of the other index portion 306. For example, if the other index portion 306 has a sampling rate of 50%, the identifier may be discarded instead of moved if it is among the 50% of identifiers that are not sampled for storage in the index portion 306.

In some examples, an identifier that was not accessed recently is accessed again. For example, the data deduplication system may access an identifier stored in an index portion 308 containing less recently accessed identifiers (e.g., to access an entry of the map 302 corresponding to the identifier). When this occurs, in some implementations the data deduplication system can remove the identifier from the index portion 308 containing less recently accessed identifiers and store the identifier in the index portion 304 for recently accessed identifiers.

Figure 4:
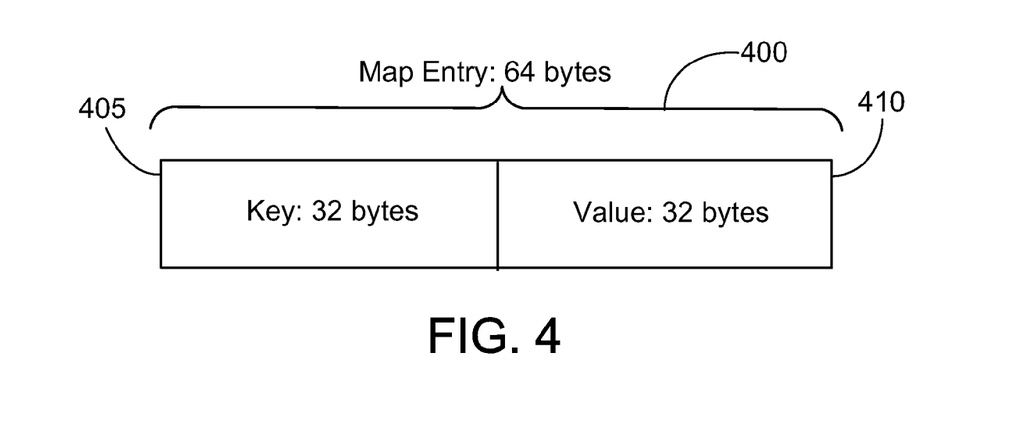
FIG. 4 shows an example map entry.

In use, the deduplication system may access an entry of the map 302 by first accessing an identifier corresponding to the entry. For example, the deduplication may access entry number 68 by accessing an identifier 320 corresponding to entry number 68. The identifier 320 corresponding to entry number 68 includes a pointer to the entry, so that the deduplication system can locate entry number 68 using the pointer included in the identifier 320. In some implementations, the deduplication system then copies entry number 68 to a cache 310, and also copies other entries 318 stored in proximity to entry number 68 to the cache. As described herein, entries stored in proximity to each other are likely to be accessed at about the same time. Thus, if the deduplication system then attempts to access the other entries 318, the deduplication system can access those entries in the cache 310 rather than access them in the map 302. FIG. 4 shows an example map entry 400. For example, the map entry 400 can include a key portion 405 and a value portion 410, each of a predetermined length (e.g., 32 bytes each for a total of 64 bytes). The key portion 405 is a computed value corresponding to a particular portion of data. In some implementations, the key portion 405 can include a key representing a result of a hash function operating on the contents of a data segment. For example, the hash function can be based on the SHA-256 cryptographic hash described above. In some examples, the key can include the hash value in combination with a domain identifier (e.g., a namespace). For example, the hash value and the domain identifier can be combined based on one of the following expressions:

Key=XOR(hash,SHA256(domain identifier))

Key=SHA256(hash,domain identifier)

In some implementations, the value portion 410 can be application-provided metadata describing a data segment. For example, the value portion 410 can include an address in the storage medium corresponding to a location where the data segment is stored. In some examples, the value portion 410 can also include other metadata, such as, a sequence number and/or a transaction identifier, which may be used to validate the deduplication advice.

Figure 5:
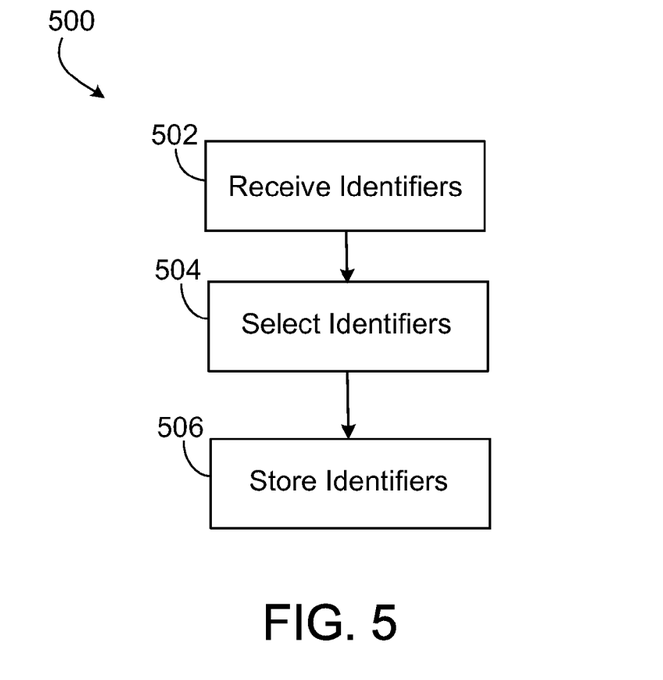
FIG. 5 shows a flowchart for an exemplary identifier storage procedure.

FIG. 5 shows a flowchart for an exemplary identifier storage procedure 500. The procedure 500 includes receiving identifiers (502), selecting the identifiers (504), and storing the identifiers (506). For example, the procedure 500 could include receiving identifiers (502) corresponding to different respective entries of a map stored in a data storage system. The identifiers can be used by a data deduplication system to locate the entries in the map. The identifiers could be generated by the data deduplication system and received after generation, for example, or the identifiers could already be stored in an index. The procedure could include selecting the identifiers (504) according to one or more selection criteria. For example, some identifiers could be selected according to a first selection criterion for storage in a first portion of an index, and some identifiers could be selected according to a second selection criterion for storage in a second portion of the index. The selection criterion could be a sampling criterion such as a sampling rate. Multiple sampling rates can be used for different portions of the index. Further, the identifiers could be sampled uniformly or non-uniformly or in some combination of these. The procedure could include storing the identifiers (506) in an index. In some examples, the identifiers may be generated by a data deduplication system and then stored. In some examples, the identifiers may be already present in the index, and the data deduplication system stores at least some of the identifiers in a different portion or location of the index than the identifiers had been stored previously. For example, the data deduplication system might remove an identifier from a portion of the index, and store another identifier in this portion of the index. This can be done, for example, so that the portion of the index does not exceed a predetermined size. The identifier removed from that portion of the index could be stored in a different portion of the index.

The techniques described above can be implemented using software for execution on a computer system. For instance, the software defines procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a computer-readable storage medium, such as a CD-ROM, readable by a general or special purpose programmable computer or delivered over a communication medium (e.g., encoded in a propagated signal) such as a network to a computer where it is executed. Each such computer program is preferably stored on or downloaded to a storage medium (e.g., solid state memory or media, or magnetic or optical media) readable by a general or special purpose programmable computer, for configuring and operating the computer system when the storage medium is read by the computer system to perform the procedures of the software.

Many other implementations of the invention other than those described above are within the invention, which is defined by the following claims.

What is claimed is:

1. A method for managing data in a data storage system, the method comprising:
 receiving identifiers corresponding to different respective entries of a map, with a particular identifier corresponding to a particular entry of the map, the particular entry including a computed value corresponding to a particular portion of data stored in the data storage system and metadata indicating a location where the particular portion of data is stored in the data storage system;
 storing at least some of the identifiers in a first portion of an index that contains multiple identifiers corresponding to a first plurality of entries of the map, the identifiers in the first portion of the index having been selected according to a first sampling criterion; and
 storing at least some of the identifiers in a second portion of the index that contains multiple identifiers corresponding to a second plurality of entries of the map, the identifiers in the second portion of the index having been selected according to a second sampling criterion different from the first sampling criterion;
 at least some of the identifiers selected according to the first sampling criterion having been selected at least in part because they were accessed more recently than the identifiers selected according to the second sampling criterion.

2. The method of claim 1, comprising generating at least some of the identifiers.

3. The method of claim 1, comprising storing the at least some of the identifiers in the first portion of the index until the first portion of the index reaches a predetermined size.

4. The method of claim 3, comprising, in response to determining that a first identifier corresponding to a first entry of the map, received after the first portion of the index reached the predetermined size, was not already stored in the first portion of the index before the first identifier was received, removing at least a second identifier corresponding to a second entry of the map from the first portion of the index, and storing the first identifier in the first portion of the index, such that the first portion of the index does not exceed the predetermined size.

5. The method of claim 4, comprising designating the second identifier for storage in the second portion of the index.

6. The method of claim 1, comprising accessing at least one of the identifiers stored in the first index and copying the entry of the map corresponding to the accessed identifier to a cache for recently accessed identifiers.

7. The method of claim 6, comprising
identifying at least one other entry of the map that was stored in the map at approximately the same time as the entry of the map corresponding to the first identifier, and copying the other entry of the map to the cache.

8. The method of claim 1, comprising
accessing at least one of the identifiers stored in the index, and
accessing an entry of the map corresponding to the accessed identifier from a cache for recently accessed identifiers.

9. The method of claim 8, comprising accessing at least one other entry of the map in the cache, wherein the other entry of the map has no corresponding identifier stored in the index.

10. The method of claim 1, wherein the first sampling criterion comprises a first sample rate.

11. The method of claim 10, wherein the second sampling criterion comprises a second sample rate different from the first sampling rate.

12. The method of claim 11, wherein the identifiers selected at a first sample rate have been accessed more recently than the identifiers selected at a second sample rate, and the first sample rate is greater than the second sample rate.

13. The method of claim 1, wherein the first sampling criterion comprises a sampling of at least some of the identifiers from a first set of identifiers.

14. The method of claim 13, wherein the second sampling criterion comprises a sampling of at least some of the identifiers from the first set of identifiers.

15. The method of claim 13, wherein the second sampling criterion comprises a sampling of at least some of the identifiers from a second set of identifiers, wherein the second set includes no identifiers in the first set.

16. The method of claim 13, wherein the second sampling criterion comprises a sampling of at least some of the identifiers from a second set of identifiers, wherein the second set includes some identifiers in the first set.

17. The method of claim 1, wherein the first sampling criterion comprises a stochastical sampling of at least some of the identifiers based on at least a portion of a value associated with the respective identifier.

18. The method of claim 17, wherein the value associated with the respective identifier comprises the computed value corresponding to the particular portion of data corresponding to the respective identifier.

19. The method of claim 1, wherein the first sampling criterion comprises a sampling of a threshold number of most recently used identifiers, wherein the threshold number is a predetermined size of the first portion of the index.

20. A computer-readable storage device storing a computer program for managing data in a data storage system, the computer program including instructions for causing a computing system to:
receive identifiers corresponding to different respective entries of a map, with a particular identifier corresponding to a particular entry of the map, the particular entry including a computed value corresponding to a particular portion of data stored in the data storage system and metadata indicating a location where the particular portion of data is stored in the data storage system;
store at least some of the identifiers in a first portion of an index that contains multiple identifiers corresponding to a first plurality of entries of the map, the identifiers in the first portion of the index having been selected according to a first sampling criterion; and
store at least some of the identifiers in a second portion of the index that contains multiple identifiers corresponding to a second plurality of entries of the map, the identifiers in the second portion of the index having been selected according to a second sampling criterion different from the first sampling criterion;
at least some of the identifiers selected according to the first sampling criterion having been selected at least in part because they were accessed more recently than the identifiers selected according to the second sampling criterion.

21. The computer readable storage device of claim 20, the computer program comprising instructions for generating at least some of the identifiers.

22. The computer readable storage device of claim 20, the computer program comprising instructions for storing the at least some of the identifiers in the first portion of the index until the first portion of the index reaches a predetermined size.

23. The computer readable storage device of claim 22, the computer program comprising instructions for, in response to determining that a first identifier corresponding to a first entry of the map, received after the first portion of the index reached the predetermined size, was not already stored in the first portion of the index before the first identifier was received, removing at least a second identifier corresponding to a second entry of the map from the first portion of the index, and storing the first identifier in the first portion of the index, such that the first portion of the index does not exceed the predetermined size.

24. The computer readable storage device of claim 23, the computer program comprising instructions for, comprising designating the second identifier for storage in the second portion of the index.

25. The computer readable storage device of claim 20, the computer program comprising instructions for accessing at least one of the identifiers stored in the first index and copying the entry of the map corresponding to the accessed identifier to a cache for recently accessed identifiers.

26. The computer readable storage device of claim 20, the computer program comprising instructions for identifying at least one other entry of the map that was stored in the map at approximately the same time as the entry of the map corresponding to the first identifier, and copying the other entry of the map to the cache.

27. The computer readable storage device of claim 20, the computer program comprising instructions for accessing at least one of the identifiers stored in the index, and
accessing an entry of the map corresponding to the accessed identifier from a cache for recently accessed identifiers.

28. The computer readable storage device of claim 27, the computer program comprising instructions for accessing at least one other entry of the map in the cache, wherein the other entry of the map has no corresponding identifier stored in the index.

29. The computer readable storage device of claim 20, wherein the first sampling criterion comprises a first sample rate.

30. The computer readable storage device of claim 29, wherein the second sampling criterion comprises a second sample rate different from the first sampling rate.

31. The computer readable storage device of claim 30, wherein the identifiers selected at a first sample rate have been accessed more recently than the identifiers selected at a second sample rate, and the first sample rate is greater than the second sample rate.

32. The computer readable storage device of claim 20, wherein the first sampling criterion comprises a sampling of at least some of the identifiers from a first set of identifiers.

33. The computer readable storage device of claim 32, wherein the second sampling criterion comprises a sampling of at least some of the identifiers from the first set of identifiers.

34. The computer readable storage device of claim 32, wherein the second sampling criterion comprises a sampling of at least some of the identifiers from a second set of identifiers, wherein the second set includes no identifiers in the first set.

35. The computer readable storage device of claim 32, wherein the second sampling criterion comprises a sampling of at least some of the identifiers from a second set of identifiers, wherein the second set includes some identifiers in the first set.

36. The computer readable storage device of claim 20, wherein the first sampling criterion comprises a stochastical sampling of at least some of the identifiers based on at least a portion of a value associated with the respective identifier.

37. The computer readable storage device of claim 36, wherein the value associated with the respective identifier comprises the computed value corresponding to the particular portion of data corresponding to the respective identifier.

38. The computer readable storage device of claim 20, wherein the first sampling criterion comprises a sampling of a threshold number of most recently used identifiers, wherein the threshold number is a predetermined size of the first portion of the index.

39. A system for managing data, comprising:
a data storage system storing the data being managed; and
a computing system comprising one or more processors and at least a memory configured to manage the data based on a map, the managing including:
receiving identifiers corresponding to different respective entries of the map, with a particular identifier corresponding to a particular entry of the map, the particular entry including a computed value corresponding to a particular portion of data stored in the data storage system and metadata indicating a location where the particular portion of data is stored in the data storage system;
storing at least some of the identifiers in a first portion of an index that contains multiple identifiers corresponding to a first plurality of entries of the map, the identifiers in the first portion of the index having been selected according to a first sampling criterion; and
storing at least some of the identifiers in a second portion of the index that contains multiple identifiers corresponding to a second plurality of entries of the map, the identifiers in the second portion of the index having been selected according to a second sampling criterion different from the first sampling criterion;
at least some of the identifiers selected according to the first sampling criterion having been selected at least in part because they were accessed more recently than the identifiers selected according to the second sampling criterion.

40. The system of claim 39, the managing comprising generating at least some of the identifiers.

41. The system of claim 39, the managing comprising storing the at least some of the identifiers in the first portion of the index until the first portion of the index reaches a predetermined size.

42. The system of claim 39, the managing comprising, in response to determining that a first identifier corresponding to a first entry of the map, received after the first portion of the index reached the predetermined size, was not already stored in the first portion of the index before the first identifier was received, removing at least a second identifier corresponding to a second entry of the map from the first portion of the index, and storing the first identifier in the first portion of the index, such that the first portion of the index does not exceed the predetermined size.

43. The system of claim 42, the managing comprising designating the second identifier for storage in the second portion of the index.

44. The system of claim 39, the managing comprising accessing at least one of the identifiers stored in the first index and copying the entry of the map corresponding to the accessed identifier to a cache for recently accessed identifiers.

45. The system of claim 44, the managing comprising identifying at least one other entry of the map that was stored in the map at approximately the same time as the entry of the map corresponding to the first identifier, and copying the other entry of the map to the cache.

46. The system of claim 39, the managing comprising accessing at least one of the identifiers stored in the index, and accessing an entry of the map corresponding to the accessed identifier from a cache for recently accessed identifiers.

47. The system of claim 46, the managing comprising accessing at least one other entry of the map in the cache, wherein the other entry of the map has no corresponding identifier stored in the index.

48. The system of claim 39, wherein the first sampling criterion comprises a first sample rate.

49. The system of claim 48, wherein the second sampling criterion comprises a second sample rate different from the first sampling rate.

50. The system of claim 48, wherein the identifiers selected at a first sample rate have been accessed more recently than the identifiers selected at a second sample rate, and the first sample rate is greater than the second sample rate.

51. The system of claim 39, wherein the first sampling criterion comprises a sampling of at least some of the identifiers from a first set of identifiers.

52. The system of claim 51, wherein the second sampling criterion comprises a sampling of at least some of the identifiers from the first set of identifiers.

53. The system of claim 52, wherein the second sampling criterion comprises a sampling of at least some of the identifiers from a second set of identifiers, wherein the second set includes no identifiers in the first set.

54. The system of claim 52, wherein the second sampling criterion comprises a sampling of at least some of the identifiers from a second set of identifiers, wherein the second set includes some identifiers in the first set.

55. The system of claim 39, wherein the first sampling criterion comprises a stochastical sampling of at least some of the identifiers based on at least a portion of a value associated with the respective identifier.

56. The system of claim 55, wherein the value associated with the respective identifier comprises the computed value corresponding to the particular portion of data corresponding to the respective identifier.

57. The system of claim 39, wherein the first sampling criterion comprises a sampling of a threshold number of most recently used identifiers, wherein the threshold number is a predetermined size of the first portion of the index.

* * * * *